Patented Mar. 17, 1942

2,276,984

UNITED STATES PATENT OFFICE 2,276,984

MANUFACTURE OF THIN BOILING STARCHES

Hans O. Kauffmann, Eggertsville, Paul H. Margulies, Kenmore, and Joseph R. Ryan, Buffalo, N. Y., assignors to Buffalo Electro-Chemical Company, Inc., Buffalo, N. Y.

No Drawing. Application April 23, 1941,
Serial No. 389,930

2 Claims. (Cl. 127—33)

The present invention relates to the manufacture of thin boiling starch and particularly to the manufacture of this type of starch by the employment of peroxides in the presence of an oxidation stimulant for modifying the action of the peroxide upon the starch.

Thin boiling starches are those which have been modified in such fashion so as to retain the physical characteristics of raw starch (undamaged grain structure, polarization characteristics, and the like) but which will yield a highly fluid solution when heated with water, in contradistinction to the action of raw starch under similar conditions which forms a paste.

Several processes are currently employed in the manufacture of thin boiling starches; one, for instance, is the treatment of raw starch with acids, and another is the treatment of raw starch with active chlorine. The first mentioned process introduces fairly large amounts of acid into the starch and complete removal of the residue of the treating substance is difficult and can be accomplished only by very thorough washing. Even so, the finished product will have an undesirable acid reaction. When treating raw starches with active chlorine, similar difficulties will be encountered due to residual material, and, moreover, a certain degree of undesirable chlorination will be unavoidable. Appreciable loss of starch is bound to happen during the washing processes necessary in either case. In this way the resulting end product will not be a neutral starch when modification has been brought about by acid, and if active chlorine has been used for this purpose, chlorination and degradation products will be present.

Numerous suggestions have been made heretofore to use oxidizing agents other than chlorine in the preparation of thin boiling starches and these suggestions include treatment of raw starch with peroxides. However, none of these suggestions has been adopted commercially due to the fact that comparatively large quantities of the peroxide were required to obtain a satisfactory thin boiling starch which tend to produce undesirable degradation products with resultant loss of starch. Moreover, the amount of peroxide necessary to obtain the final thin boiling starch was so high that the use of peroxides became uneconomical in competition with other chemical treatments.

An illustration of a procedure intended to overcome these difficulties can be found in British Patent 25,121 (1909). With the intention to increase the activity of the peroxide or percompounds used in the manufacture of thin boiling starch certain metal salts, such as aluminum chloride, zinc chloride, or ferric chloride, were used in an amount of about 1% based on the weight of dry starch in conjunction with an otherwise unspecified amount of a peroxide or a percompound. Such a procedure suffers from the same disadvantages of operations where the production of thin boiling starch is carried out by means of acids, since the solutions employed in the described procedure are highly acid due to the presence of highly acid salts.

The salts described in the above mentioned patent have a well-known effect on starch even when used as such and without the addition of a further modifying agent, such as a peroxide or a percompound. These salts are swelling agents and will cause a modification of a starch, especially when used in an amount of as much as 1% based on the weight of dry starch. It is further stated in this patent that the addition of a peroxide or a percompound will further promote this specific action of the salt employed and will result in the production of a thin boiling starch. This thin boiling starch, however, will be of acid reaction and, moreover, will be contaminated with about 1% of metal salts. These two facts will make very thorough washing a necessity, and the same difficulties will be encountered as in the case of acid-modified starch. It will be found very difficult to remove residues of the treating substances employed and it will be found almost impossible to obtain an end product of neutral reaction and free of undesirable impurities.

The process of preparing thin boiling starches from raw starch according to the present invention is based on the discovery that certain metals or their compounds, usually considered as having a strong decomposing effect on solutions of peroxide, are able to activate the modifying action of peroxide on raw starch provided the metal or the metal compound is used in very small amounts. These necessary amounts are, in fact, so small that the quantity dissolved out of a solid piece of metal by the treating solution will in some cases already be sufficient to produce the desired promoting effect on the oxidizing agents used. The upper limit for the amount of metal or metal compounds to be used has been found to be in the neighborhood of about 0.1% on the weight of the dry starch. This value is, of course, only a rough figure for the limiting value and considerably smaller percentages will be found satisfactory for commercial purposes. The fact that the metals or metal compounds used act as promoters only is evident when the action of these agents on starch is investigated under exactly the same conditions under which starch modification, according to this invention, is brought about, no oxidizing agent being added to the treating solution. It will be found that the metals or metal compounds used in the present invention as oxidation stimulants, even when applied in considerably higher amounts, have no effect whatsoever on the starch and are incapable of producing anything resembling thin boiling starch. It has been found that copper and copper salts and manganese and manganese salts, if used in very small amounts, act as oxidation stimulants only and are especially suitable for aiding the commercial production of thin boiling starch by the employment of a peroxide, because they will show maximum activity in slightly alkaline or neutral solutions. Other metals or their compounds will act as oxidation stimulants for peroxide in its modifying action on starch under acid conditions, but these are commercially of minor value, because the resulting thin boiling starch will again be of acid reaction, thereby necessitating extensive washing operations.

It has been found that the employment of copper or copper salts and manganese or manganese salts as oxidation stimulants permits the production of neutral thin boiling starch and increases the effectiveness of the true modifying agent used, namely, the peroxide, about 5 to 7 times. That is to say, a thin boiling starch producing when dissolved with hot water a solution of a specified viscosity can be prepared with about ⅕ to ⅐ the amount of peroxide when the treatment is performed in conjunction with the metals or metal salts than that which is required to produce the same viscosity in the absence of these salts, all other conditions being relatively the same in both cases. By thus increasing the effectiveness of the peroxide it is now possible and economically feasible to prepare thin boiling starches by the employment of peroxides as the starch modifying agent. The small amount of peroxide employed in the process makes this process relatively inexpensive, and further, the excessive amounts of undesirable degradation products, as, for instance, reducing substance, are not encountered. Furthermore, the amount of metal salts introduced with the peroxide solution as an oxidation stimulant is far below the limit which would cause manufacturers and consumers of thin boiling starches to raise objections to the product. The fact that copper or manganese, or their salts, produce the desired promoter effect in neutral or slightly alkaline solutions makes it possible to produce directly a neutral thin boiling starch by the introduction of a very small quantity of an alkali, such as sodium carbonate, into the treating mixture and by this means neutralize the small amount of acidic products formed during the modification of the starch by the peroxide employed.

The following examples are given by way of illustration only and are not limitative of the process:

*Experiment No. 1*

500 grams of pearl corn starch were treated for about 3 hours at a temperature of 40 to 50° C., a temperature below the gel point of the starch, with an amount of water sufficiently large to permit the formation of a slurry. The aqueous mix contained 5 grams of hydrogen peroxide of 100 volume strength, 0.01 grams of copper sulfate crystals and 1 gram of sodium carbonate. After the 3 hour heating period the peroxide was completely used up and the starch was filtered from the solution and dried in the conventional way. A 3% solution of this modified thin boiling dry starch was made by heating the proper amount of the dry starch with water for 10 to 15 minutes. The viscosity of the resulting thin boiling starch solution was determined by measuring the draining time in seconds of the solution from a standard viscosimeter tube. The draining time of this solution was 40 seconds.

*Experiment No. 2*

An identical sample was treated in the same fashion except that the copper sulfate was increased to 1 gram. The draining time was determined for the finished product as 195 seconds.

*Experiment No. 3*

A 3% solution of the original raw corn starch was prepared and the draining time determined in the same fashion as in Experiment No. 1. The draining time of the raw starch solution was 200 seconds.

*Experiment No 4*

500 grams of the original pearl corn starch were treated with the same amount of water at the same temperature and for the same time employing 5 grams 100 volume hydrogen peroxide and 1 gram sodium carbonate, a mixture identical with the mixture of the first experiment except that copper sulfate was not added. A 3% solution of this dried starch was prepared and its draining time determined as 190 seconds. These measurements indicate that the amount of peroxide used was insufficient to produce thin boiling starch but that a thin boiling starch can be produced from this quantity of peroxide by the addition of a comparatively small quantity of an oxidation stimulant.

The above examples are illustrative of starch treatments carried out under conditions producing a slurry of the starch. However, modification of the starch in accordance with the present invention with the production of thin boiling starch may be readily effected under almost all ratios of treating solution to starch, the amount of water present being immaterial, the important factor being the quantity of chemicals based on the dry starch and not so much their concentration. Thus, it is possible to prepare thin boiling starch by any procedure whereby the necessary chemicals may be evenly distributed throughout the starch in amounts sufficient to modify the starch in the desired fashion. For instance, the concentration of the peroxide may be increased in the treating solution, the starch stirred therewith and excess solution filtered off. The amount of the chemicals retained by the starch suffices to produce the desired modification while the starch is dried in a conventional way.

Comparable results are obtained when employing manganese compounds, as, for instance, manganese sulfate, as the oxidation stimulant. Metallic copper and metallic manganese in contact with the solution of starch and peroxide also give results comparable with the ion of salts of these metals.

Thin boiling starches produced by the employment of peroxide and oxidation stimulant give a pure blue coloration with iodine, which test indicates that the modified thin boiling dry starch, or the solution produced therefrom, is not contaminated to any extent by starch degradation products.

Although hydrogen peroxide is shown in the experimental tests as the peroxide employed, comparable results can be obtained from any peroxide, i. e., alkali and alkaline earth metal peroxides, the perborates, persilicates, perphosphates, and the like, which produce hydrogen peroxide in aqueous solution, due provision being made for pH adjustment.

It will be seen from the above that thin boiling starches can be readily prepared with relatively small quantities of peroxides with the production of a dry product requiring substantially no after-treatment, such as washing or neutralizing, and a product that is relatively free of metal salts and degradation products of starch.

The terms "copper compound" and "manganese compound," as used herein, refer to compounds of copper or of manganese, such as salts of either of these metals, or to ions of the metals.

What is claimed is:

1. A method of preparing thin boiling starch from raw starch which comprises treating the raw starch with a peroxide at a temperature below the gel point of the starch in the presence of an amount not more than 0.1% of an oxidation stimulant selected from the group consisting of metallic copper, copper compounds, metallic manganese and manganese compounds whereby the action of the peroxide on the starch is catalyzed but the peroxide is not decomposed rapidly.

2. A method of preparing thin boiling starch from raw starch which comprises treating the raw starch with a peroxide at a temperature below the gel point of the starch in the presence of an amount of an oxidation stimulant selected from the group consisting of metallic copper, copper compounds, metallic manganese and manganese compounds sufficient to catalyze the modifying action of peroxide on starch but insufficient to effect rapid decomposition of the peroxide.

HANS O. KAUFFMANN.
PAUL H. MARGULIES.
JOSEPH R. RYAN.